July 24, 1923.
A. L. ALLRED
1,462,755
COMBINATION ANIMAL CRATE
Filed April 18, 1922     3 Sheets-Sheet 1
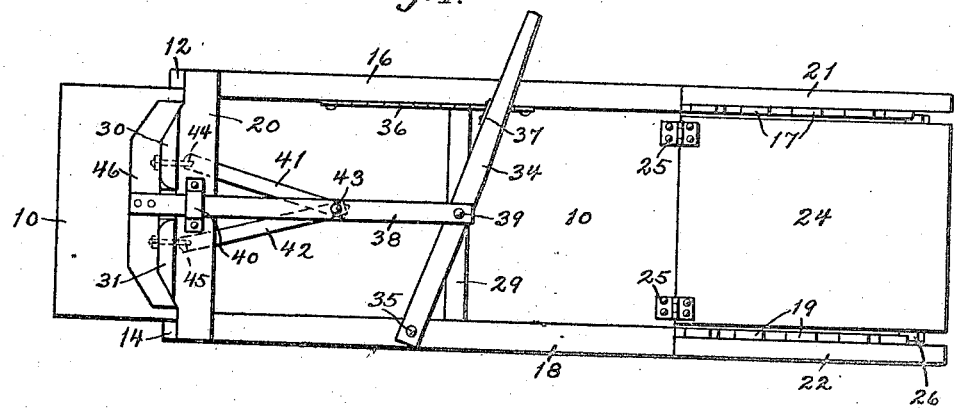
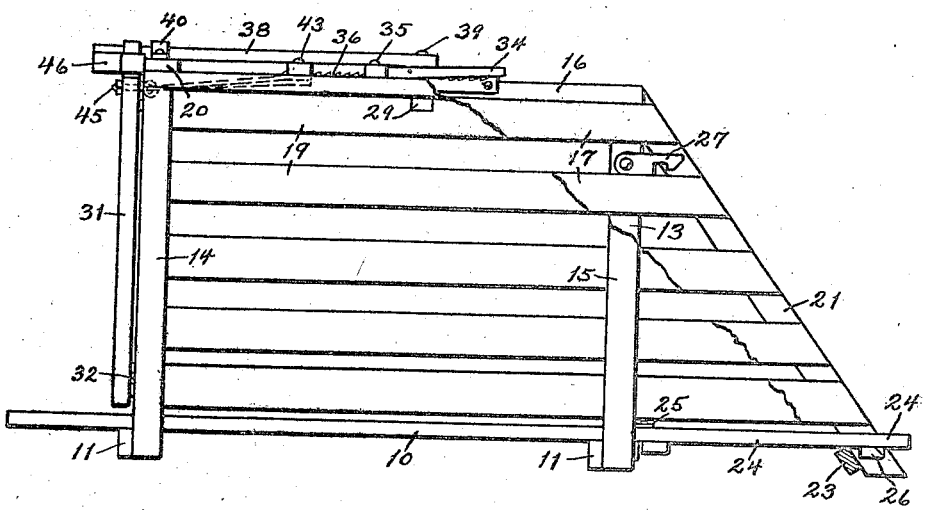
Inventor
A. L. ALLRED
by Earl M. Sinclair
Atty.

July 24, 1923.
A. L. ALLRED
1,462,755
COMBINATION ANIMAL CRATE
Filed April 18, 1922
3 Sheets-Sheet 2
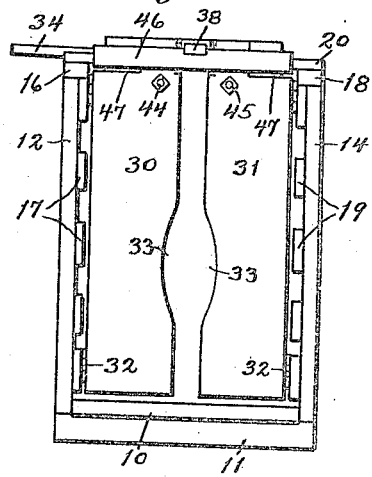
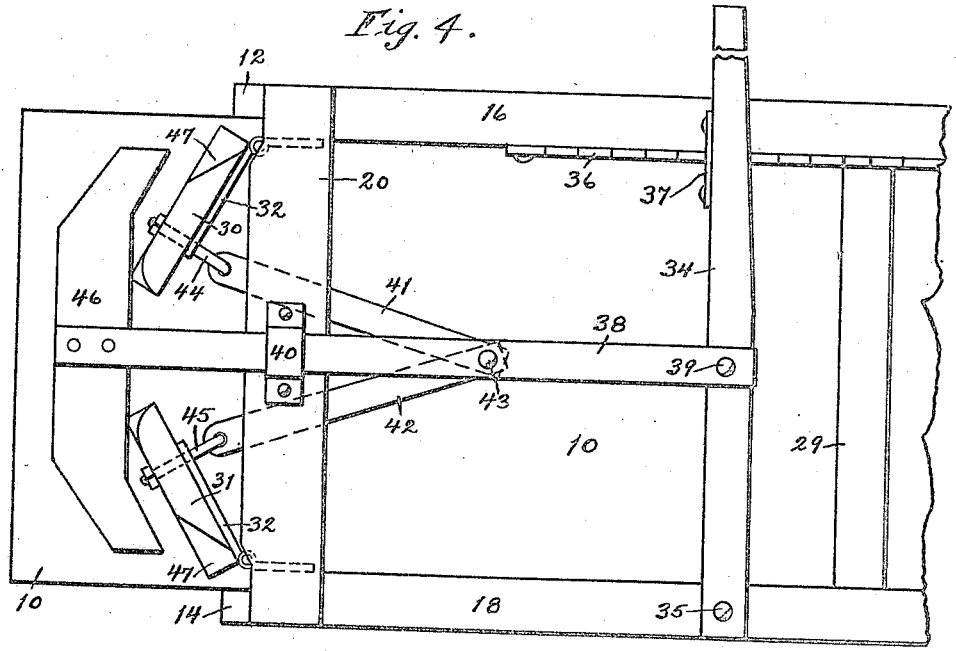
Inventor,
A. L. ALLRED
by Earl M. Sinclair
Atty.

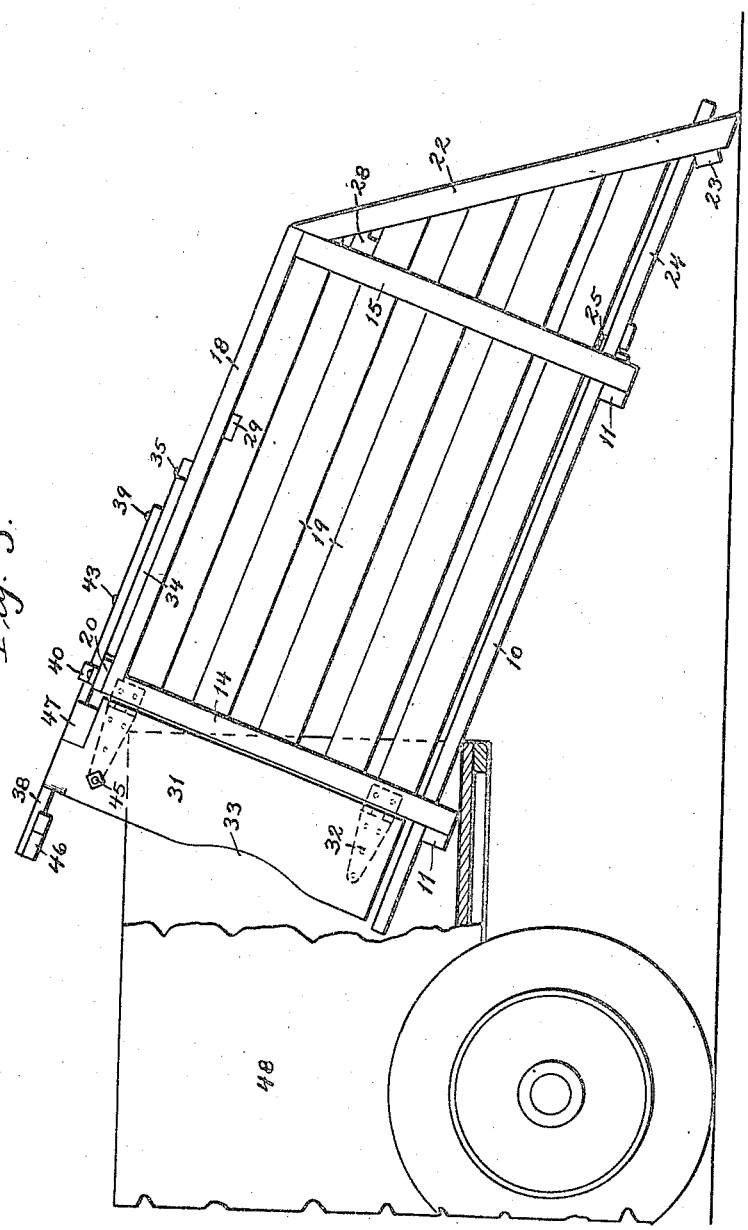

Patented July 24, 1923.

1,462,755

UNITED STATES PATENT OFFICE.

ABRAHAM L. ALLRED, OF CORYDON, IOWA.

COMBINATION ANIMAL CRATE.

Application filed April 18, 1922. Serial No. 554,917.

*To all whom it may concern:*

Be it known that I, ABRAHAM L. ALLRED, a citizen of the United States of America, and resident of Corydon, Wayne County, Iowa, have invented a new and useful Combination Animal Crate, of which the following is a specification.

An object of this invention is to provide an improved animal crate adapted for a variety of uses, such as simply confining the animal for transportation or the like, or to be transformed into a loading chute, or to be used as an animal catching and holding crate for convenience in ringing or performing other operations on the animal.

A further object of this invention is to provide an improved construction for an animal crate especially adapted for use in holding an animal such as a hog in a relatively stationary position while ringing or otherwise operating upon or treating him, the catching and holding function of the crate being automatic after the animal has gained a certain position in and relative to the parts of the crate.

A further object of this invention is to provide an improved construction for a crate adapted to permit the free entrance of a hog or other animal thereto, preventing his egress and automatically catching and holding him upon attempting to leave the crate.

With these and other objects in view, my invention consists in the construction, arrangement and combination of elements hereinafter set forth, pointed out in my claims and illustrated by the accompanying drawing, in which—

Figure 1 is a plan view of my improved crate showing the rear door open and the forward door wholly closed. Figure 2 is a side elevation of the same, partly in section. Figure 3 is a front elevation of the device. Figure 4 is a detail plan view of the forward portion of the device, on an enlarged scale, showing the forward doors set in proper position to automatically engage and hold a hog attempting to leave the crate. Figure 5 is a side elevation showing the device in position for use as a loading chute.

In the construction of the device as shown the numeral 10 designates a floor, preferably of solid construction, having cleats 11 arranged transversely of its lower surface and near its ends. Posts or standards 12, 13, 14, 15 rise from the corners of the device, extending past the floor 10 adjacent and fixed to projecting ends of the cleats 11. The posts 12, 13 at one side are connected at their upper ends by a rail 16 and between their ends by spaced slats 17; and the posts 14, 15 on the opposite side are connected at their upper ends by a rail 18 and between their ends by spaced slats 19. A cross-bar 20 extends across the forward end of the crate, resting on and secured to the forward ends of the rails 16, 18. Inclined braces 21, 22 are fixed to and extend downwardly and rearwardly from the upper ends of the rear posts and said braces are connected, on the forward faces of their lower ends, by a cross-bar 23. The slats 17, 19 are extended rearwardly from and beyond the rear posts 13, 15, progressively, to contact with, and be secured to, the inclined braces 21, 22. The rear end of the floor 10 is substantially in the same vertical plane as the rear margins of the posts 13, 15, and a rear door 24 is secured at one margin to the rear end portion of said floor, by hinges 25. The door 24 is adapted to be placed at times in horizontal position as a continuation of the floor, its free margin resting loosely on the cross-brace 23, as shown in the drawings; and is adapted at times to be moved through an arc to vertical position to close the rear end of the crate. The door 24 is provided with a transverse cleat 26 on its rear face, near its free end, having its ends projecting beyond the side margin of the door and adapted to be engaged by detents 27, 28 pivoted on the inner faces, respectively, of the rear posts 13, 15, to hold the door in closed position. A cross-bar 29 also may be provided, intermediate of the crate, engaging and secured to the lower faces of the rails 16, 18.

A pair of swinging doors, 30, 31 are provided and are adapted conjunctively to close the forward end of the device, said doors being pivoted to the side walls by strap hinges 32 fixed to their inner faces. The doors 30, 31 do not quite meet at the median line of the crate when fully closed, but a narrow space is provided between them, as shown in Figure 3, and further space is provided in a portion of the length of the doors by forming curved notches or seats 33 on their inner margins between their upper and lower ends, for a purpose hereinafter to be made clear. A lever 34 is pivoted at one end on one top rail, such as 18, by a bolt 35, near the longitudinal center of the device, said lever extending across the device and in sliding contact with the opposite side rail, such as 16. A ratchet plate 36 is mounted against the inner face and longitudinally of the top rail 16, said ratchet plate having rearwardly directed teeth adapted to be engaged by a blade 37 fixed to and projecting downwardly from the lever 34. An operating bar 38 is pivoted at one end by a bolt 39 to an intermediate portion of the lever 34 and extends forwardly therefrom, on the median line and at the top of the device, passing slidingly through a keeper 40 on the forward cross-bar 20. Links 41, 42 are conjunctively pivoted at their rear ends by a bolt 43 to an intermediate portion of the operating bar 38, extend forwardly at divergent angles toward the doors 30, 31 and are pivoted at their forward ends to eye bolts 44, 45 passing through said doors adjacent their free margins. The bolts 44, 45 may pass through the end holes of the strap hinges 32. A cross-head 46 is fixed at its center to the forward end of the operating bar 38 and lies in front of the doors 30, 31, said doors extending above the plane of the said rod, which occupies the space between said doors when closed. The cross-head 46 is formed with rearwardly inclined portions at its ends adapted to be received within notches 47 in the upper ends of the doors 30, 31 at their outer margins, and the inner margins of said doors, in the vertical plane of the cross-head, are formed on arcs; so that said cross-head fits snugly against the outer faces of the doors when closed, as shown in Figure 1; and does not interfere with opening movement of the doors.

In practical use the forward doors 30, 31 are opened and closed by oscillating the lever 34 manually, motion being transmitted through the operating bar 38 and links 41, 42. When fully opened the doors 30, 31 stand substantially in the planes of the side walls of the crate, and the floor 10 preferably is extended at its forward end beyond said side walls a distance approximately equal to the width of the doors. The door 24 also may be opened to a position forming a continuation of the floor, and when so arranged the device may be employed as a loading chute in connection with a wagon or truck 48, as shown in Figure 5, the forward end resting on the floor of the vehicle by contact of the lower ends of the posts 12, 14, and the rear end resting on the floor or ground, by contact of the lower ends of the inclined braces 21, 22. If an animal enters but refuses to pass through the crate he may be confined therein by manipulation of the doors, as is hereafter made more clear, and the rear end of the device lifted so that it may be slid into the vehicle.

It is obvious also that the device may be used simply and solely as a crate, for transportation or other purposes, by confining an animal therein by closing and latching the doors by the means provided. When the forward doors are fully closed they are latched in such position by engaging the blade 37 of the lever with a notch near the rear end of the ratchet bar 36, thus preventing forward movement of the operating bar; and the cross-head fitting closely to and confining the doors and supplementing the holding action through the links.

The most valuable feature of the device however is that which adapts it to use in confining and holding an animal at the forward end of the crate with his head and jowls projecting through and between the forward doors 30, 31. The animal is first induced or forced to enter the crate from the rear end, through the door 24, which is then closed manually. First, however, the forward doors 30, 31 are set manually to partially open position, as indicated particularly in Figure 4, and held against further opening movement by engagement of the blade 37 on the lever with a selected one of the teeth of the ratchet plate 36. The lever is free to move rearwardly of the ratchet plate to permit complete or partial closing of the doors. By setting the doors thus in partially opened position a space is provided between them, and particularly at the level of the notches or seats 33, sufficient to permit the passage of the head and jowls of a hog (or other animal), but not wide enough to permit his shoulders to pass through; and the degree of opening of the doors manually is regulated and determined by the size of the animal to be engaged. The animal after entering the crate extends his head through the space between the doors but his progress is checked by engagement of his shoulders with the margins of the doors. Then he may, and usually will, attempt to withdraw his head from between the doors, which action has the result of pulling the doors rearwardly toward closing position, the lever 34 sliding freely on the ratchet plate, and this causes the doors by their free margins to engage and hold the animal fast so that he cannot move in either direction. While so held it is convenient to place a ring in the animal's nose, administer medicine or other treatment to him, or perform other operations which may be indicated. This method of engaging and holding the animal is automatic as above described, and is particularly effective for ringing or other operations on the animal's head, as the head projects without the crate where it is accessible while the body is entirely within the crate.

The automatic engaging and holding function may be employed when the device is used as a loading chute as previously described, whereby the animal is confined at the forward or upper end of the device, thus facilitating the manual tilting and loading of the chute with its load.

I claim as my invention—

1. An animal-catching crate, comprising an enclosure, a pair of doors hinged at their outer margins at one end of the enclosure, a lever arranged for oscillation, an operating bar slidably mounted and having pivotal connections with said lever, flexible connections between said operating bar and the free marginal portions of said doors, a ratchet adapted to be engaged by said lever to permit closing movement of said doors but preventing opening movement thereof, and a cross-head fixed to the forward end of said operating bar and adapted to engage the outer faces of said doors.

2. An animal-catching crate, comprising an enclosure, a pair of doors hinged at their outer margins at one end of said enclosure, a lever arranged for oscillation, an operating bar slidably mounted and having pivotal connections with said lever, flexible connections between said operating bar and the free marginal portions of said doors, means to prevent oscillation of said lever in one direction, and a cross head fixed to the free end of said operating bar and adapted to engage the outer faces of said doors, said cross-head being formed with rearwardly inclined portions at its ends adapted to be received within notches in said doors, whereby said cross-head fits snugly against and in confining relation to said doors when in closed position.

Signed at Des Moines, in the county of Polk and State of Iowa, this 14th day of April, 1922.

ABRAHAM L. ALLRED.